United States Patent
Kwon et al.

(10) Patent No.: US 8,059,775 B2
(45) Date of Patent: Nov. 15, 2011

(54) METHOD OF TRANSMITTING/PLAYING MULTIMEDIA DATA OVER WIRELESS NETWORK AND WIRELESS DEVICE USING THE METHOD

(75) Inventors: Chang-yeul Kwon, Yongin-si (KR); Seong-soo Kim, Seoul (KR); Ki-bo Kim, Suwon-si (KR); Se-young Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 12/242,118

(22) Filed: Sep. 30, 2008

(65) Prior Publication Data

US 2009/0031365 A1 Jan. 29, 2009

Related U.S. Application Data

(63) Continuation of application No. 11/727,065, filed on Mar. 23, 2007.

(30) Foreign Application Priority Data

Jun. 5, 2006 (KR) .................. 10-2006-0050504

(51) Int. Cl.
*H04L 7/00* (2006.01)
(52) U.S. Cl. ........................................ 375/356
(58) Field of Classification Search .......... 375/354, 375/356, 365, 366
See application file for complete search history.

(56) References Cited

U.S. PATENT DOCUMENTS

| 6,671,520 | B1 | 12/2003 | Kim |
| 7,054,546 | B2 * | 5/2006 | Murakami et al. ............... 386/98 |
| 7,559,015 | B2 * | 7/2009 | Munetsugu et al. .......... 715/204 |
| 2005/0108762 | A1 | 5/2005 | Chao et al. |
| 2006/0140265 | A1 * | 6/2006 | Igler et al. ................ 375/240.01 |
| 2006/0294573 | A1 * | 12/2006 | Rogers et al. ................. 725/147 |

FOREIGN PATENT DOCUMENTS

| EP | 1 401 224 A1 | 3/2004 |
| JP | 2000-324163 A | 11/2000 |
| JP | 2001-267946 A | 9/2001 |
| KR | 10-0336517 B1 | 5/2002 |
| KR | 2003-0005092 A | 1/2003 |
| KR | 10-0599452 B1 | 7/2006 |
| WO | 2005/020634 A1 | 3/2005 |

\* cited by examiner

*Primary Examiner* — Kevin Kim
(74) *Attorney, Agent, or Firm* — Sughrue Mion, PLLC

(57) ABSTRACT

A method and apparatus for efficiently transmitting large multimedia data over a wireless network are provided. A wireless device includes a device information reading unit which receives and reads information regarding available capabilities of devices included in a wireless network; a control unit which selects a first device which can process a video stream and a second device which can process an audio stream from the devices based on the information; a stream generation unit which generates a video stream and an audio stream which form the same content; and a wireless transmission/reception unit which transmits the generated video stream to the first device and transmits the generated audio stream to the second device.

24 Claims, 7 Drawing Sheets

METHOD OF TRANSMITTING/PLAYING MULTIMEDIA DATA OVER WIRELESS NETWORK AND WIRELESS DEVICE USING THE METHOD

CROSS-REFERENCE TO RELATED APPLICATION

This is a continuation of application Ser. No. 11/727,065 filed Mar. 23, 2007. The entire disclosure of the prior application number is considered part of the disclosure of the accompanying continuation application and is hereby incorporated by reference. This application claims priority from Korean Patent Application No. 10-2006-0050504 filed on Jun. 5, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to wireless communication technology, and more particularly, to efficiently transmitting large multimedia data over a wireless network.

2. Description of the Related Art

As networks become wireless and the demand for large multimedia data transmission increases, there is a need for studies on an effective transmission method in a wireless network environment. In particular, various home devices are increasingly required to wirelessly transmit high-quality videos, such as digital versatile disk (DVD) videos or high definition television (HDTV) videos.

An IEEE 802.15.3c task group is developing a technological standard for transmitting large-volume data over a wireless home network. The technological standard, which is called "millimeter wave (mm Wave)," uses an electric wave having a physical wavelength of a millimeter, i.e., an electric wave having a frequency band of 30-300 GHz to transmit the large-volume data. This frequency band, which is an unlicensed band, has conventionally been used by communication service providers or used for limited purposes, such as observing electric waves or preventing vehicle collision.

FIG. 1 is a diagram comparing frequency bands of the IEEE 802.11 series of standards and mmWave. Referring to FIG. 1, the IEEE 802.11b or IEEE 802.11g standard uses a carrier frequency of 2.4 GHz and has a channel bandwidth of approximately 20 MHz. In addition, the IEEE 802.11a or IEEE 802.11n standard uses a carrier frequency of 5 GHz and has a channel bandwidth of approximately 20 MHz. On the other hand, mmWave uses a carrier frequency of 60 GHz and has a channel bandwidth of approximately 0.5-2.5 GHz. Therefore, it can be understood that mmWave has a much greater carrier frequency and channel bandwidth than the conventional IEEE 802.11 series of standards.

When a high-frequency signal (a mmWave) having a millimeter wavelength is used, a very high transmission rate of several Gbps can be achieved. Since the size of an antenna can also be reduced to less than 1.5 mm, a single chip including the antenna can be implemented. Furthermore, interference between devices can be reduced due to a very high attenuation ratio of the high-frequency signal in the air.

However, the high-frequency signal has a short distance range due to the very high attenuation ratio. In addition, since the high-frequency signal has high directability, it is difficult to have a proper communication in a non-line-of-sight environment. In mmWave, an array antenna having a high gain is used to solve the former problem, and a beam steering method is used to solve the latter problem.

Recently, a method of transmitting uncompressed data using mmWave in a high-frequency band of several tens of GHz has been introduced to home and office environments, along with a related art method of transmitting compressed data using a band of several GHz of the IEEE 802.11 standard series.

Since uncompressed audio and video (AV) data is large-volume data that is not compressed, it can be transmitted only in a high-frequency band of several tens of GHz. Even when having a packet loss, the uncompressed AV data has relatively less effect on the quality of video display than the compressed data. Therefore, there is no need for an automatic repeat request or a retry.

FIG. 2 is a block diagram illustrating a method of transmitting a multimedia stream from a source device to a sink device in a related art wireless home network. Referring to FIG. 2, a source device 21 transmits a multiplexed AV stream to a sink device 22. The source device 21 is a device generating an AV stream from a multimedia source and wirelessly transmitting the AV stream, such as a set-top box, a DVD player, or a portable multimedia player (PMP). The sink device 22 is a device receiving the AV stream and outputting the AV stream in a form that can be audio-visually perceived by a user, such as a beam projector, a television (TV), a monitor, or an AV receiver. Each of the source device 21 and the sink device 22 includes a wireless network interface. From the perspective of a wireless network, the source device 21 operates as a transmitting device, and the sink device 22 operates as a receiving device.

A broad bandwidth is required to transmit large multimedia data such as uncompressed video data, e.g., data that presents red (R), green (G) and blue (B) or yellow-ultraviolet (YUV) components, which constitute a pixel, as digital values. Although the sink device 22 can process only either of a video stream and an audio stream, if the source device 21 transmits an AV stream which contains both audio and video data to the sink device 22, the bandwidth is wasted. Therefore, the source device 21 needs to adaptively transmit a video stream, an audio stream, or an AV stream according to the available capability of the sink device 22.

SUMMARY OF THE INVENTION

The present invention provides a method and apparatus for efficiently transmitting large multimedia data to various sink devices in a high-frequency band of several tens of GHz.

According to an aspect of the present invention, there is provided a wireless device including a device information reading unit which receives and reads information regarding available capabilities of devices included in a wireless network; a control unit which selects a first device and a second device from the devices based on the information; a stream generation unit which generates a video stream and an audio stream which form the same content; and a wireless transmission/reception unit which transmits the video stream to the first device, and transmits the audio stream to the second device.

According to another aspect of the present invention, there is provided a wireless device including a device information storage unit which provides information regarding an available capability of the wireless device to other devices included in a wireless network; a wireless transmission/reception unit which receives one of a video stream and an audio stream from a source device among the devices based on the information; a time information reading unit which reads time information included in the video stream or the audio stream; and a media play unit which plays video or audio included in the video stream or the audio stream at a time indicated by the time information.

According to another aspect of the present invention, there is provided a wireless device including a device information collection unit which collects information regarding available capabilities of devices included in a wireless network; a wireless transmission/reception unit which receives an AV stream, into which a video stream and an audio stream are multiplexed, from a source device among the devices based on the information; a media play unit which demultiplexes the received AV stream into the video stream and the audio stream, and plays each of the video and audio streams; a video output unit which outputs the video stream which is played to a user; and an audio retransmission unit which retransmits the audio stream which is played through a cable.

According to another aspect of the present invention, there is provided a method of transmitting multimedia data. The method includes receiving and reading information regarding available capabilities of devices included in a wireless network; selecting a first device and a second device from the devices based on the information; generating a video stream and an audio stream which form the same content; and transmitting the video stream to the first device and transmitting the audio stream to the second device.

According to another aspect of the present invention, there is provided a method of playing multimedia data. The method includes providing information regarding an available capability of a wireless device to other devices included in a wireless network; receiving one of a video stream and an audio stream from a source device among the devices based on the information; reading time information included in the video stream or the audio stream; and playing video or audio included in the video stream or the audio stream at a time indicated by the time information.

According to another aspect of the present invention, there is provided a method of playing multimedia data. The method includes collecting information regarding available capabilities of devices included in a wireless network; receiving an AV stream, into which a video stream and an audio stream are multiplexed, from a source device among the devices based on the information; demultiplexing the AV stream into the video stream and the audio stream, and playing each of the video and audio streams; outputting the video stream which is played to a user; and retransmitting the audio stream which is played through a cable.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art.

Figure 1:
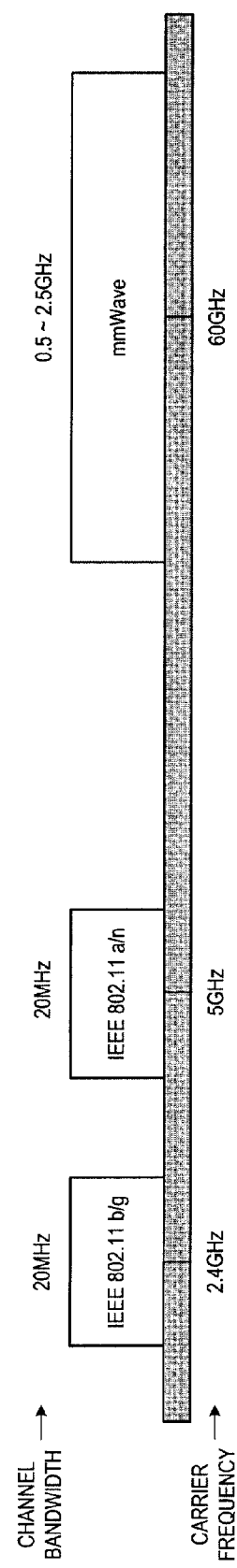
FIG. 1 is a diagram comparing frequency bands of IEEE 802.11 series of standards and mmWave.
Figure 2:
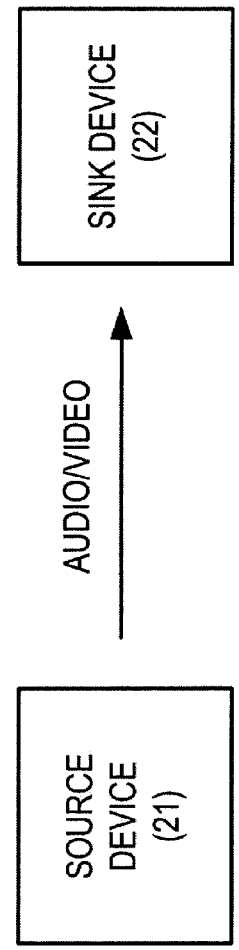
FIG. 2 is a block diagram illustrating a method of transmitting a multimedia stream from a source device to a sink device in a related art wireless home network.
Figure 3:
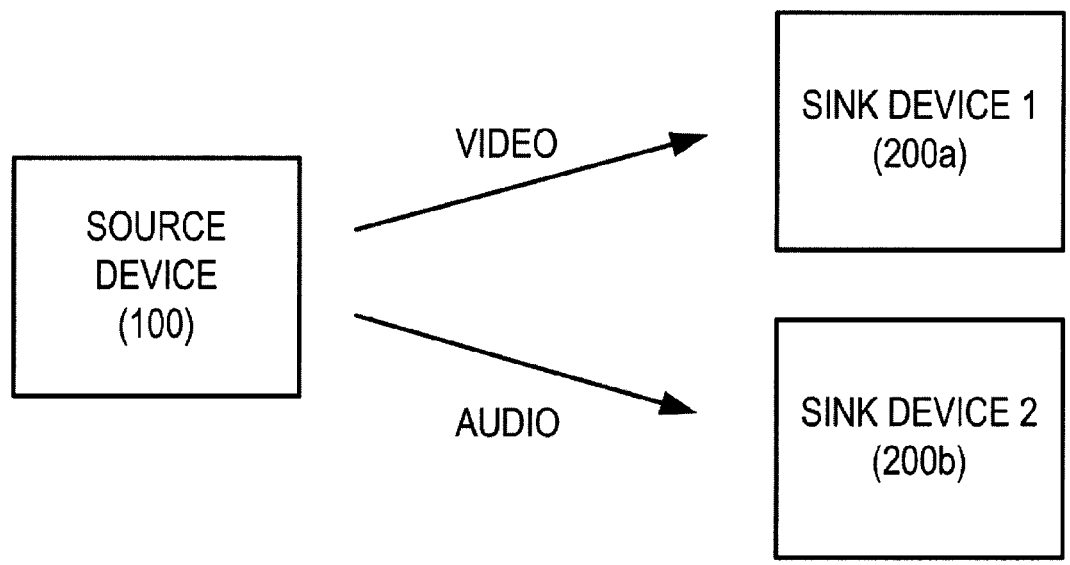
FIG. 3 is a conceptual diagram of a large multimedia data transmission system according to an exemplary embodiment of the present invention.

FIG. 3 is a conceptual diagram of a large multimedia data transmission system according to an exemplary embodiment of the present invention.

Referring to FIG. 3, a source device 100 selectively transmits a video stream or an audio stream according to the available capability of a sink device. If a first sink device 200a is a device which can process only a video stream, such as a monitor, a beam projector or a plasma display panel (PDP), the source device 100 transmits a video stream to the first sink device 200a. In addition, if a second sink device 200b is a device which can process only an audio stream, such as an AV receiver or a motion picture experts group (MPEG) layer-3 (MP3) decoder, the source device 100 transmits an audio stream to the second sink device 200b.

In this case, it is required to synchronize the audio and video streams, which form the same content, in order to properly play the audio and video streams. Such synchronization will be described later with reference to FIG. 6.

As described above, a source device needs to know the available capability of each sink device in order to select a type of a stream to transmit. Since the source device and the sink devices are wireless devices that form a wireless network, each device informs its available capability to other wireless devices when associating with the wireless network.

Figure 4:
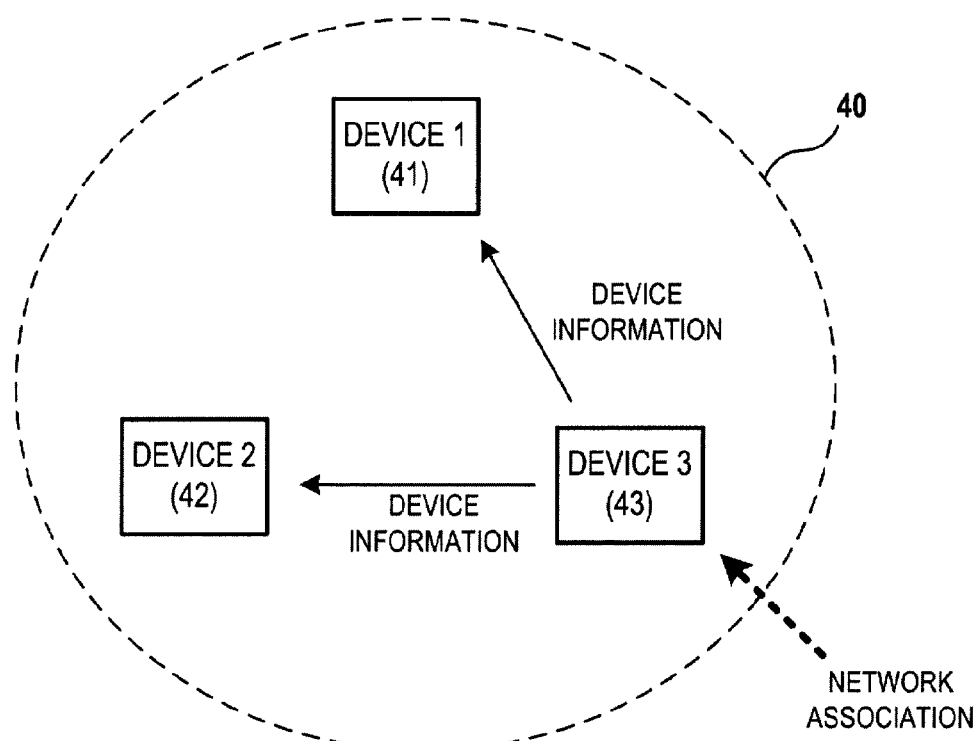
FIG. 4 illustrates a process of transmitting device information from a wireless device to another wireless device according to an exemplary embodiment of the present invention.

FIG. 4 illustrates a process of transmitting device information from a wireless device to another wireless device according to an exemplary embodiment of the present invention.

Referring to FIG. 4, a wireless network 40 is composed of a first device 41 and a second device 42. When a third device 43 associates with the wireless network 40, it notifies the first and second devices 41 and 42 of information regarding its available capability. Such notification of the information regarding the available capability is given regardless of whether the wireless network 40 has an infrastructure network structure based on an access point, e.g., IEEE 802.11 series of standards, or an ad hoc network structure centered on a Piconet coordinator (PNC). In any case, if the third device 43 joins the wireless network 40, it directly sends the information regarding its available capability to the first and second devices 41 and 42 or indirectly sends the information to them through a medium.

The information regarding the available capability of the third device 43 may include a model name of the third device 43, manufacturer information, a supported communication method such as a modulation method and a transmission rate, a processable video stream format, and a processable audio stream format. A source device can determine whether a sink device (the third sink device 43) can process a video stream or an audio stream based on the information regarding the available capability of the sink device.

Figure 5:
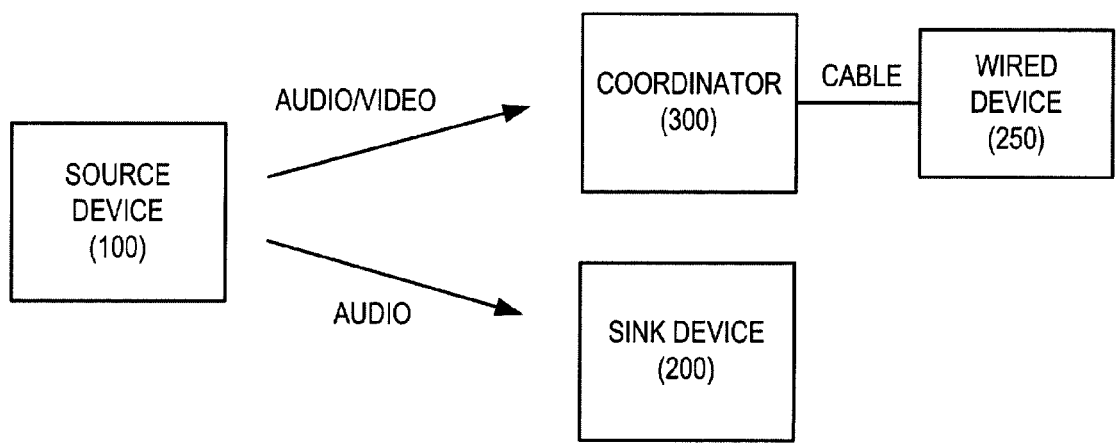
FIG. 5 is a conceptual diagram of a large multimedia data transmission system according to another exemplary embodiment of the present invention.

FIG. 5 is a conceptual diagram of a large multimedia data transmission system according to another exemplary embodiment of the present invention.

Referring to FIG. 5, a network coordinator 300 can process both audio and video streams, such as a TV. In addition, the network coordinator 300 initiates, maintains, terminates and manages a network, such as an IEEE 802.15.3 PNC. A wired device 250 is connected to an external terminal of the network coordinator 300 by a cable and outputs sound provided by the network coordinator 300 to a user. The wired device 250 may be a speaker or a combination of an amplifier and a speaker. The sink device 200, which is an audio device, receives an audio stream from the source device 100. The user may select either the sink device 200 or the wired device 250 to output sound.

In a process, such as an association process, of forming a network including one or more source devices and one or more sink devices, the network coordinator 300 receives information regarding available capability of each of the source and sink devices. Then, the network coordinator 300 transmits the received information to other source and sink devices. In multimedia data transmission, the source device 100 transmits a video stream or an audio stream if a receiving device is the sink device 200. If the receiving device is the network coordinator 300, the source device 100 transmits an AV stream.

If the available capability of the receiving device is not sufficient to process high transmission data, the source device 100 may transmit a compressed video stream or a compressed audio stream.

The source device 100 according to an exemplary embodiment of the present invention selectively transmits a video stream, an audio stream, or an AV stream, according to the available capability of a receiving device as illustrated in FIGS. 3 and 5. If a video stream and an audio stream that belong to the same content are played in different receiving devices, a process of synchronizing the video and audio streams must be performed.

Figure 6:
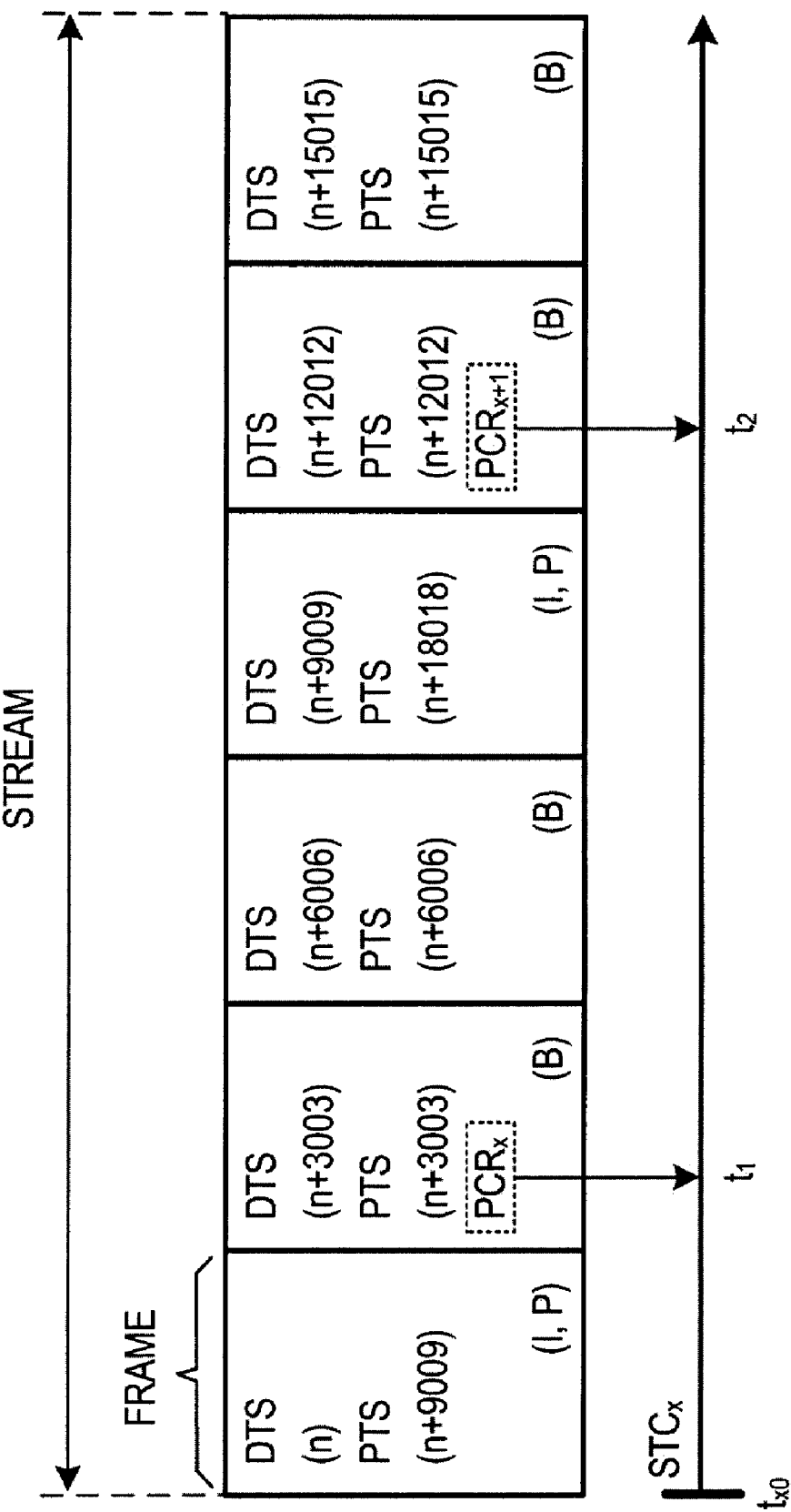
FIG. 6 illustrates information added to a stream for synchronization when a source device transmits the stream according to an exemplary embodiment of the present invention.

FIG. 6 illustrates information added to a stream for synchronization when a source device transmits the stream according to an exemplary embodiment of the present invention.

A video stream may be composed of an intra-coded frame (I frame), a predictive-coded frame (P frame), and a bi-directional predictive-coded frame (B frame). The I frame can be decoded on its own, and the P frame can be decoded based on a preceding I or P frame. In addition, the B frame can be decoded based on I frames or P frames preceding and following the B frame.

As described above, the video stream includes the above frames arranged in a predetermined order. When the frames are played, they are decoded according to their characteristics, and are presented in a predetermined order. Referring to FIG. 6, a decoding time stamp (DTS) indicating a time when each frame is decoded and a presentation time stamp (PTS) indicating a time when each frame is played are set for each frame included in a video stream.

Times of the DTS and PTS correspond to reference times generated by a system time clock (STC) installed in a source device. The STC is actually a counter value circulating at intervals of 26 hours. If image data is recorded using a National Television Standards Committee (NTSC) method, the difference between counter values of frames is 3,003 (3,600 in the case of a phase alternating line (PAL) method).

Accordingly, referring to FIG. 6, if DTS(n), where a counter value of the STC is n, is set to a header of a first frame, a next DTS is n+3003 followed by n+6006, n+9009, n+12012, and n+15015, sequentially.

The PTS is set based on the DTS and may be set variously according to types of frames. For example, if the cycles of I and P frames are three frames, that is, if the number of B frames successively inserted between I or P frames is two and thus the I or P frame appears at intervals of three frames, the PTS of the I or P frame is a value obtained after DTS values of three frames are added.

Hereinafter, a case where both the DTS and the PTS are used will be described. However, since the DTS and the PTS are equal in the case of B frames, only the PTS may be recorded in the video stream. In addition, even if B frames do not exist in the video stream, since an I frame can be decoded on its own and an I or P frame required for a P frame to be decoded already exists, only the PTS can be recorded in the video stream.

A program clock reference (PCR) indicating a corresponding relationship between a STC, which is a reference time, and stream data is also recorded in the video stream. In other words, since the DTS and the PTS are STC values of a source device, they do not match STC values of a sink device. Therefore, the PCR is recorded in the video stream in order to non-periodically correct STC values of the source device for frames of stream data.

For example, referring to FIG. 6, $PCR_x$ and $PCR_{x+1}$ are recorded in the second and fifth frames from the left. When each frame is processed, the sink device reads this information. Accordingly, the sink device perceives that the second frame from the left was processed at a time $t_1$ and corrects its STC. In addition, based on the information of $PCR_{x+1}$ included in the fifth frame from the left, the sink device perceives that the fifth frame was processed at a time $t_2$ and corrects its STC, thereby playing the video stream.

While there may be some differences in encoding and decoding methods, an audio stream is similar to a video stream in that it is composed of a plurality of audio frames. The stream illustrated in FIG. 6 may denote a video stream or an audio stream, and the frame may denote a video frame or an audio frame.

As described above, a source device records a DTS, a PTS and a PCR in each of video frames that form a video stream and in each of audio frames that form an audio stream, and transmits the video and audio streams accordingly. Therefore, even if a sink device or a network coordinator receives only either of the video stream and the audio stream, the video and audio streams can be properly synchronized when played.

Hereinafter, a wireless device according to an exemplary embodiment of the present invention denotes a source device, a sink device, or a network coordinator. The wireless device includes a transmission/reception unit performing mmWave communication.

Figure 7:
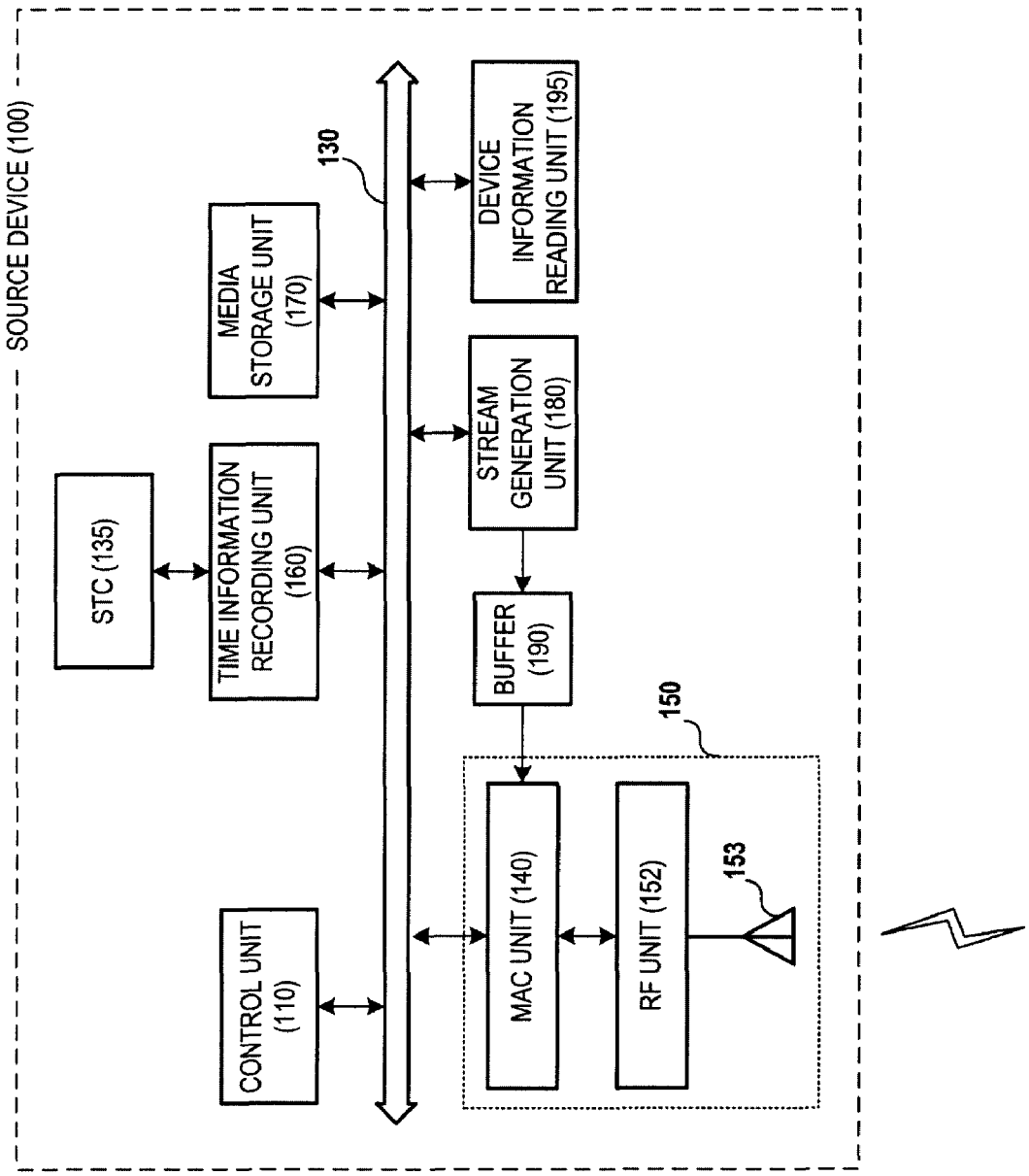
FIG. 7 is a block diagram of a source device according to an exemplary embodiment of the present invention.

FIG. 7 is a block diagram of a source device according to an exemplary embodiment of the present invention.

Referring to FIG. 7, a source device 100 includes a device information reading unit 195 receiving and reading information regarding available capabilities of devices included in a wireless network, a control unit 110 selecting a first device which can process a video stream and a second device which can process an audio stream based on the information regarding the available capabilities of the devices, a stream generation unit 180 generating a video stream and an audio stream that form the same content, and a transmission/reception unit 150 transmitting the video stream to the first device and transmitting the audio stream to the second device. The source device 100 may further include an STC 135, a time information recording unit 160, a media storage unit 170, and a buffer 190.

When a device associates with the wireless network, it transmits information regarding its available capability to other devices in the wireless network. Here, the information includes a processable video stream format, a processable audio stream format, and a supported communication method.

The control unit 110 controls other components connected to a bus 130. In addition, the control unit 110 may select a network coordinator, which can process an AV stream obtained after a video stream and an audio stream are multiplexed, from the devices based on the information regarding the available capabilities of the devices in the wireless network. In this case, the transmission/reception unit 150 transmits the AV stream to the network coordinator.

The network coordinator is a wireless device initiating, maintaining, and terminating the wireless network. The network coordinator can receive and process an AV stream.

The media storage unit 170 stores multimedia data received from an external source or from a recording medium and provides the multimedia data to the stream generation unit 180.

The stream generation unit 180 generates a video stream and an audio stream from the received multimedia data. If the multimedia data is data into which video data and audio data are multiplexed, the stream generation unit 180 demultiplexes the multimedia data.

The time information recording unit 160 inserts time information for synchronizing the generated video and audio streams into the video stream and the audio stream. The time information includes a PCR and at least one of a PTS and a DTS. The time information may be presented as a counter value provided by the STC 135.

In this case, the PTS and the DTS may be recorded in the video stream or the audio stream in units of frames, and the PCR may be recorded in the video stream or the audio stream at irregular frame intervals.

The buffer 190 temporarily stores the received video or audio stream and provides the stored video or audio stream to the transmission/reception unit 150. The buffer 190 may be a nonvolatile memory device such as a flash memory, a volatile memory device such as a random access memory (RAM), or a storage medium such as a hard disk or an optical disk, and may be implemented in different forms known to the art to which the present invention pertains.

A medium access control (MAC) unit 140 adds an MAC header to a stream received from the buffer 190, generates an MAC protocol data unit (MPDU), and transmits the generated MPDU through a radio frequency (RF) unit 152. The RF unit 150 generates a wireless signal after processing a baseband signal and transmits the wireless signal over the air through an antenna 153.

Figure 8:
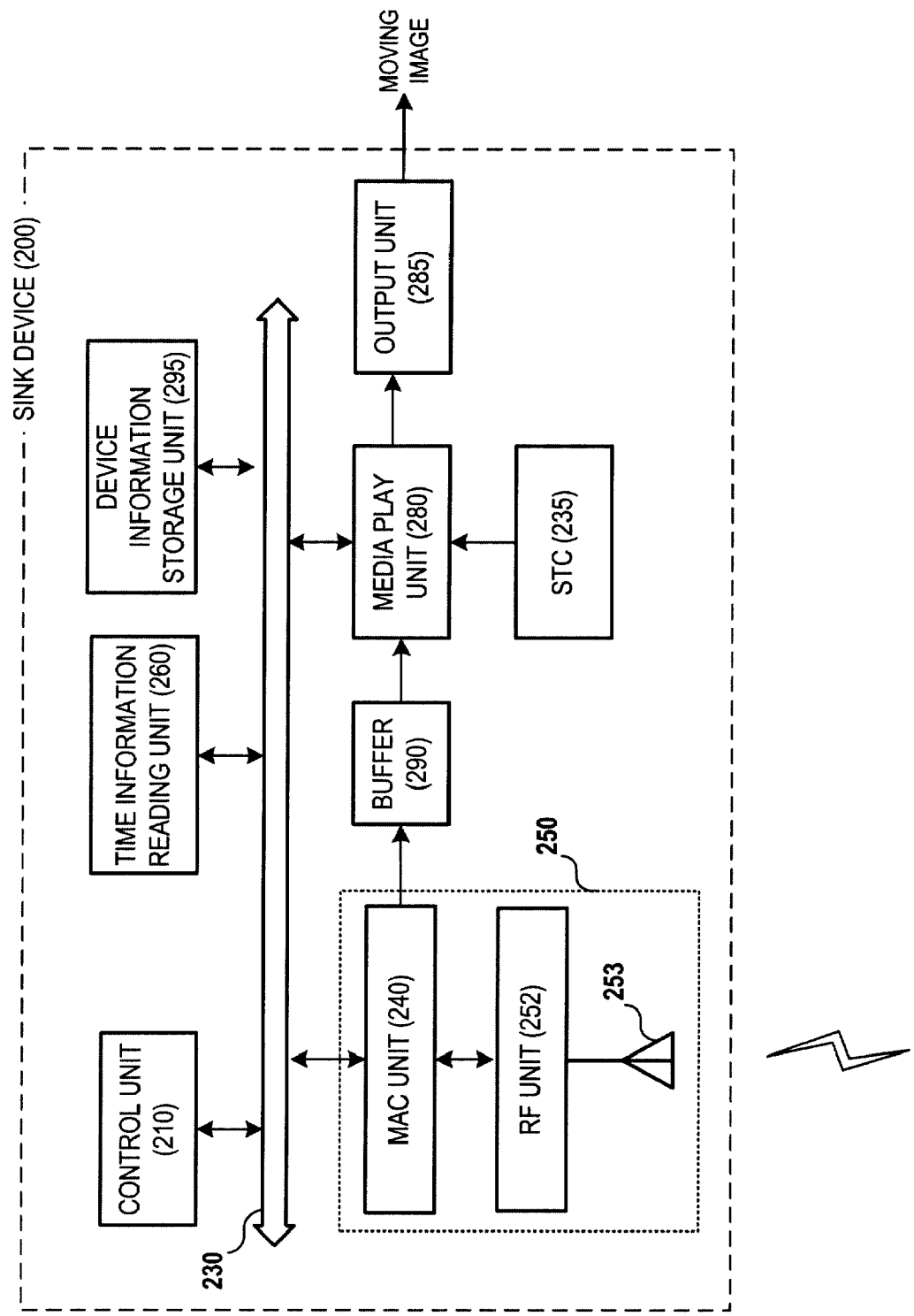
FIG. 8 is a block diagram of a sink device according to an exemplary embodiment of the present invention.

FIG. 8 is a block diagram of a sink device according to an exemplary embodiment of the present invention.

Referring to FIG. 8, a sink device 200 includes a device information storage unit 295 providing information regarding available capabilities of devices included in a wireless network, a transmission/reception unit 250 receiving one of a video stream and an audio stream from a source device among the devices based on the information, a time information reading unit 260 reading time information included in the received stream, and a media play unit 280 playing video or audio included in the received stream at a time indicated by the read time information.

When the sink device 200 associates with the wireless network, it directly sends information regarding its available capability to other devices or indirectly sends the information through a network coordinator. The information includes a processable video stream format, a processable audio stream format, and a supported communication method.

The time information includes a PCR and at least one of a PTS and a DTS. The PTS and the DTS may be recorded in the received stream in units of frames, and the PCR may be recorded in the received stream at irregular frame intervals.

The sink device 200 may further include a control unit 210, an STC 235, an output unit 285, and a buffer 290.

The control unit 210 controls other components connected to a bus 230. The STC 235 displays a local time within the sink device 200 as a counter value. The counter value of the STC 235 may be different from a value of the STC 135 of the source device 100 illustrated in FIG. 7. Therefore, the media play unit 280 frequently corrects the STC 235 according to a PCR read by the time information reading unit 260. Accordingly, the STC 135 and the STC 235 may maintain equal counter values.

The transmission/reception unit 250 is configured similar to the transmission/reception unit 150 of the source device 100 illustrated in FIG. 7. In a receiving operation, the transmission/reception unit 250 receives a wireless signal via an antenna 253. Then, an RF unit 252 modulates the wireless signal into digital data, and an MAC unit 240 removes an MAC header from the digital data. The digital data having the MAC header removed may be an audio stream or a video stream.

The buffer 290 temporarily stores the video stream or the audio stream provided by the transmission/reception unit 250 and provides the stored video or audio stream to the media play unit 280.

The media play unit 280 includes a video codec such as MPEG-1, MPEG-2, MPEG-4, H.264 or Windows media video (WMV), or an audio codec such as MP3, audio codec (AC) 3 or Windows media audio (WMA), in order to play the video or audio stream.

The output unit 285 outputs the video or audio stream played by the media play unit 280 to a user. Accordingly, the output unit 285 may be a display device or a combination of an amplifier and a speaker.

Figure 9:
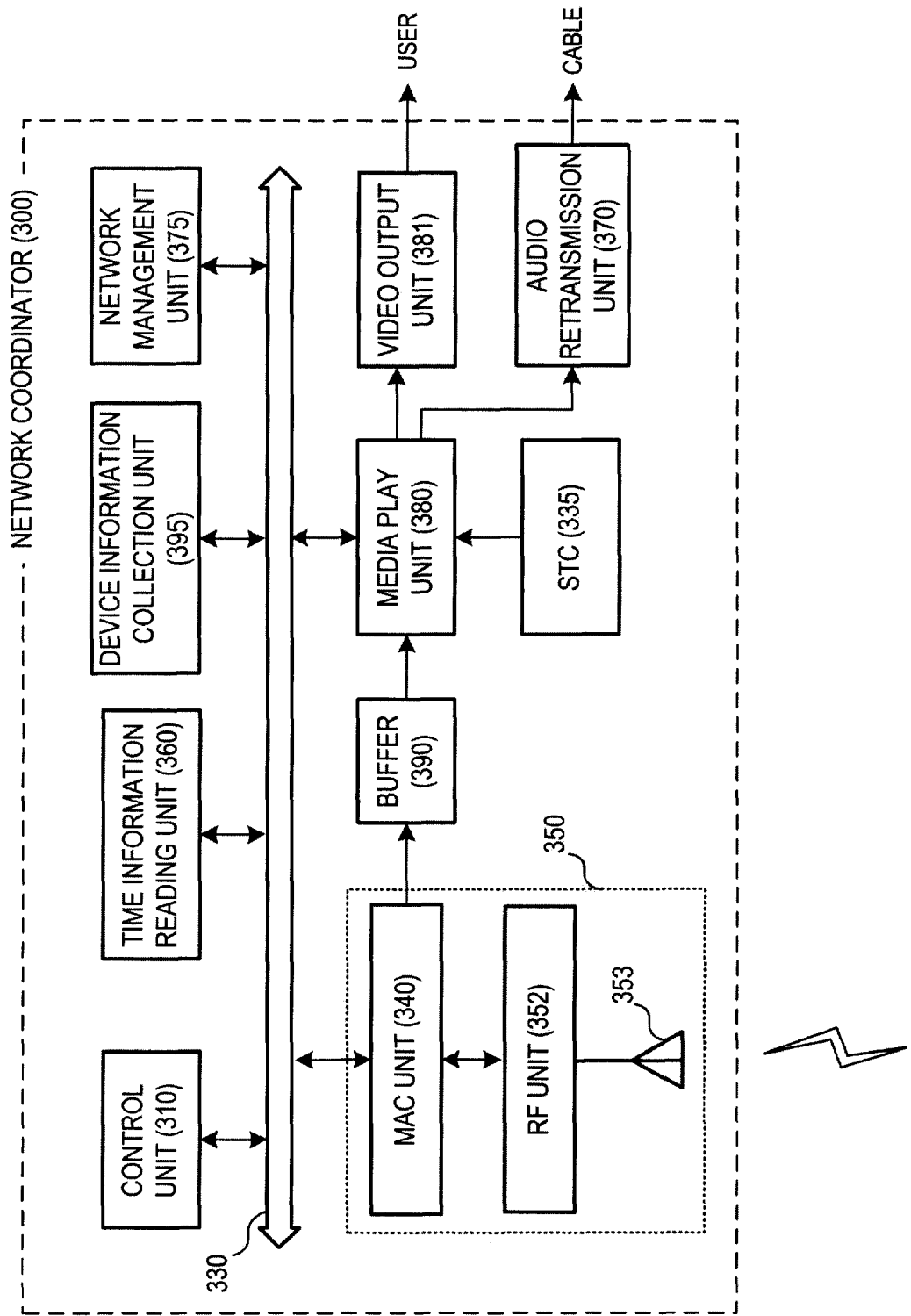
FIG. 9 is a block diagram of a network coordinator according to an exemplary embodiment of the present invention.

FIG. 9 is a block diagram of a network coordinator according to an exemplary embodiment of the present invention.

Referring to FIG. 9, a network coordinator 300 is basically configured similar to the sink device 200 illustrated in FIG. 8. However, they are different in that the network coordinator 300 further includes a network management unit 375 managing the initiation, maintenance and termination of a network, a device information collection unit 395 collecting device information provided by other devices, and a audio retransmission unit 370 retransmitting sound to a wired device, such as an amplifier or a speaker, through a cable. Therefore, the network coordinator 300 receives an AV stream, into which an audio stream and a video stream are multiplexed, from the source device 100 illustrated in FIG. 7, and retransmits played sound to the wired device through the cable. The network coordinator 300 may be implemented as a digital TV having a wireless network, and the network management unit 375 may be implemented as a PNC module in IEEE 802.15.3.

The device information collection unit 395 collects information regarding available capabilities of devices included in a wireless network when the devices associate with the wireless network. Then, the device information collection unit 395 provides the collected information to other devices in the wireless network periodically or whenever requested.

A transmission/reception unit 350 receives the AV stream from the source device 100 which is provided with the information retained by the network coordinator 300.

A buffer 390 temporarily stores the received AV stream and provides the stored AV stream to a media play unit 380.

The media play unit 380 frequently corrects an STC 335 according to a PRC read by a time information reading unit 360. In addition, the media play unit 380 includes a video codec such as MPEG-1, MPEG-2, MPEG-4, H.264 or WMV, or an audio codec such as MP3, AC 3 or WMA, in order to play the video or audio stream.

The media play unit 380 outputs a video signal which is input to a video output unit 381 and an audio signal which is input to the audio retransmission unit 370.

The video output unit 381 is a visual display device and visually displays the video signal to a user. The audio retransmission unit 370 retransmits the audio signal through the cable. For example, the audio retransmission unit 370 is an external sound terminal, and the retransmitted audio signal may be an analog signal.

Each component described above with reference to FIGS. 7 through 9 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may be reside on a computer readable storage medium or may be distributed over a plurality of computers.

As described above, according to the exemplary embodiments of the present invention, large multimedia data is transmitted according to user's requirements. Therefore, the efficiency of network use can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A wireless device comprising:
a device information reading unit which receives and reads information regarding available capabilities of devices included in a wireless network, the information regarding available capabilities of devices including information indicating whether the devices can process a video stream or an audio stream;
a control unit which selects a first device that can process a video stream and a second device that can process an audio stream from the devices based on the information indicating whether the devices can process a video stream or an audio stream;
a stream generation unit which generates a video stream and an audio stream which form the same content;
a time information recording unit which inserts time information for synchronizing the generated video and audio streams into the video stream and the audio stream, wherein the time information includes information indicating a corresponding relationship between a system time clock (STC), which is a reference time, and stream data; and
a wireless transmission and reception unit which transmits the video stream to the first device, and transmits the audio stream to the second device,
wherein the information regarding the available capabilities of the devices is transmitted when each of the devices associates with the wireless network.

2. The device of claim 1, wherein the control unit selects a network coordinator, which can process an audio and video (AV) stream obtained after the video stream and the audio stream are multiplexed, from the devices based on the information regarding the available capabilities of the devices, and the transmission and reception unit transmits the AV stream to the network coordinator.

3. The device of claim 2, wherein the network coordinator initiates, maintains, and terminates the wireless network.

4. The device of claim 1, wherein the information regarding the available capabilities of the devices comprises at least one of a processable video stream format, a processable audio stream format, and a supported communication method.

5. The device of claim 1, wherein the time information comprises a program clock reference (PCR) and at least one of a presentation time stamp (PTS) and a decoding time stamp (DTS).

6. The device of claim 5, wherein the PTS and the DTS are recorded in the video stream or the audio stream in units of frames, and the PCR is recorded in the video stream or the audio stream at irregular frame intervals.

7. The device of claim 1, wherein the transmission and reception unit performs a millimeter wave communication, and the video stream is uncompressed video data.

8. A wireless device comprising:
a device information storage unit which provides information regarding an available capability of the wireless device to other devices included in a wireless network, the information regarding available capability of the wireless device including information indicating whether the wireless device can process a video stream or an audio stream;
a transmission and reception unit which receives one of a video stream and an audio stream from a source device among the devices based on the information indicating whether a video stream or an audio stream can be processed by the wireless device;
a time information reading unit which reads time information included in the video stream or the audio stream, wherein the time information is inserted into the video stream and the audio stream for synchronizing the received video and audio streams, and the time information includes information indicating a corresponding relationship between a system time clock (STC), which is a reference time, and stream data; and
a media play unit which plays video or audio included in the video stream or the audio stream at a time indicated by the time information,
wherein the information regarding the available capability of the wireless device is transmitted when the wireless device associates with the wireless network.

9. The device of claim 8, further comprising an output unit which outputs the video or the audio which is played to a user.

10. The device of claim 8, wherein the information regarding the available capability of the wireless device comprises at least one of a processable video stream format, a processable audio stream format, and a supported communication method.

11. The device of claim 8, wherein the time information comprises a program clock reference (PCR) and at least one of a presentation time stamp (PTS) and a decoding time stamp (DTS).

12. The device of claim 11, wherein the PTS and the DTS are recorded in the video stream or the audio stream in units of frames, and the PCR is recorded in the video stream or the audio stream at irregular frame intervals.

13. The device of claim 12, wherein the media play unit corrects a the STC according to the PCR.

14. The device of claim 8, wherein the transmission and reception unit performs a millimeter wave communication, and the video stream is uncompressed video data.

15. A wireless device comprising:
a device information collection unit which collects information regarding available capabilities of devices included in a wireless network, the information regarding available capabilities of devices including information indicating whether the devices can process a video stream or an audio stream;
a wireless transmission and reception unit which receives an audio and video (AV) stream, into which a video stream and an audio stream are multiplexed, from a source device among the devices based on the information indicating whether the devices can process a video stream or an audio stream, wherein time information is inserted into the video stream and the audio stream for synchronizing the video and audio streams, and the time information includes information indicating a corresponding relationship between a system time clock (STC), which is a reference time, and stream data;
a media play unit which demultiplexes the AV stream into the video stream and the audio stream, and plays each of the video and audio streams;
a video output unit which outputs the video stream which is played to a user; and
an audio retransmission unit which retransmits the audio stream which is played through a cable,
wherein the information regarding the available capabilities of the devices is transmitted when each of the devices associates with the wireless network.

16. The device of claim 15, further comprising a network management unit which initiates, maintains, and terminates the wireless network.

17. The device of claim 15, wherein the audio retransmission unit is an external sound terminal, and the retransmitted audio stream is an analog signal.

18. A method of transmitting multimedia data, the method comprising:
receiving and reading information regarding available capabilities of devices included in a wireless network, the information regarding available capabilities of devices including information indicating whether the devices can process a video stream or an audio stream;
selecting a first device that can process a video stream and a second device that can process an audio stream from the devices based on the information indicating whether the devices can process a video stream or an audio stream;
selecting a second device that canprocess an audio stream from the devices based on the information;
generating a video stream and an audio stream which form the same content;
inserting time information for synchronizing the generated video and audio streams into the video stream and the audio stream, wherein the time information includes information indicating a corresponding relationship between a system time clock (STC), which is a reference time, and stream data and;
transmitting the video stream to the first device and transmitting the audio stream to the second device;
wherein the information regarding the available capabilities of the devices is transmitted when each of the devices associates with the wireless network.

19. A method of playing multimedia data, the method comprising:
providing information regarding an available capability of a wireless device to other devices included in a wireless network, the information regarding available capabilities of the wireless device including information indicating whether the wireless device can process a video stream or an audio stream;
receiving one of a video stream and an audio stream from a source device among the devices based on the information indicating whether the wireless device can process a video stream or an audio stream;
reading time information included in the video stream or the audio stream; and
playing video or audio included in the video stream or the audio stream at a time indicated by the time information wherein the time information being inserted for synchronizing the received video and audio streams into the video stream and the audio stream, wherein the time information includes information indicating a corresponding relationship between a system time clock (STC), which is a reference time, and stream data,
wherein the information regarding the available capabilities of the wireless device is transmitted when the wireless device associates with the wireless network.

20. A method of playing multimedia data, the method comprising:
collecting information regarding available capabilities of devices included in a wireless network, the information regarding available capabilities of devices including information indicating whether the devices can process a video stream or an audio stream;
receiving an audio and video (AV) stream, into which a video stream and an audio stream are multiplexed, from a source device among the devices based on the information indicating whether the devices can process a video stream or an audio stream;
demultiplexing the AV stream into the video stream and the audio stream, and playing each of the video and audio streams, wherein each of the video and audio streams is played at a time indicated by the time information, wherein the time information being inserted for synchronizing the received video and audio streams into the video stream and the audio stream, wherein the time information includes information indicating a corresponding relationship between a system time clock (STC), which is a reference time, and stream data;
outputting the video stream which is played to a user; and
retransmitting the audio stream which is played through a cable,
wherein the information regarding the available capabilities of the devices is transmitted when each of the devices associates with the wireless network.

21. A wireless device comprising:
a device information reading unit which receives and reads information regarding available capabilities of devices connected to a network, the information regarding available capabilities of devices including information indicating whether the devices can process a video stream or an audio stream;

a control unit which selects at least one sink devices that can process a video or audio stream based on the information indicating whether the devices can process a video stream or an audio stream;

a time information recording unit which inserts information for synchronizing the video and audio streams into the video stream and the audio stream, wherein the time information includes information indicating a corresponding relationship between a system time clock (STC), which is a reference time, and stream data; and a transmission and reception unit which transmits a video stream or an audio stream to the at least one sink devices, wherein the information regarding the available capabilities of the devices is transmitted when each of the devices associates with the wireless network.

22. The device of claim 21, wherein the at least one sink devices comprise a first sink device which receives the video stream and a second sink device which receives the audio stream.

23. The device of claim 21, wherein the at least one sink devices comprise a first sink device which receives the video stream and the audio stream and a second sink device which receives the audio stream.

24. The device of claim 23, wherein the first sink device processes the audio stream and outputs the audio stream to a separate audio device through a wired cable.

* * * * *